(12) United States Patent
Vujcic

(10) Patent No.: US 9,179,423 B2
(45) Date of Patent: Nov. 3, 2015

(54) POWER LIMITED CASE SIGNALING

(75) Inventor: Dragan Vujcic, Limours (FR)

(73) Assignee: LG ELECTRONICS INC., Seoul (KR)

(*) Notice: Subject to any disclaimer, the term of this patent is extended or adjusted under 35 U.S.C. 154(b) by 81 days.

(21) Appl. No.: 13/877,646

(22) PCT Filed: Oct. 4, 2011

(86) PCT No.: PCT/KR2011/007306
§ 371 (c)(1),
(2), (4) Date: Apr. 3, 2013

(87) PCT Pub. No.: WO2012/046989
PCT Pub. Date: Apr. 12, 2012

(65) Prior Publication Data
US 2013/0201955 A1  Aug. 8, 2013

Related U.S. Application Data

(60) Provisional application No. 61/389,663, filed on Oct. 4, 2010.

(51) Int. Cl.
| H04W 52/30 | (2009.01) |
| H04W 52/40 | (2009.01) |
| H04W 52/36 | (2009.01) |
| H04L 5/00  | (2006.01) |
| H04W 52/34 | (2009.01) |

(52) U.S. Cl.
CPC ............. *H04W 52/365* (2013.01); *H04L 5/001* (2013.01); *H04W 52/34* (2013.01)

(58) Field of Classification Search
CPC ............ H04W 52/365; H04W 52/146; H04W 52/367; H04W 52/08; H04W 52/30; H04W 72/04; H04W 72/0413; H04L 27/2601

USPC ............................ 370/252, 254, 255; 455/522
See application file for complete search history.

(56) References Cited

U.S. PATENT DOCUMENTS

| 8,730,829 B2* | 5/2014 | Hwang et al. ............... 370/252 |
| 8,744,513 B2* | 6/2014 | Chen et al. .................. 455/522 |
| 9,008,000 B2* | 4/2015 | Kim et al. .................... 370/328 |
| 9,055,585 B2* | 6/2015 | Lohr et al. ......................... 1/1 |
| 2007/0015476 A1* | 1/2007 | Akbar Attar et al. ...... 455/127.1 |
| 2009/0092055 A1* | 4/2009 | Balasubramanian et al. 370/252 |
| 2010/0118805 A1* | 5/2010 | Ishii et al. .................... 370/329 |
| 2010/0120397 A1* | 5/2010 | Kazmi et al. ................. 455/410 |
| 2010/0158147 A1 | 6/2010 | Zhang et al. |

(Continued)

OTHER PUBLICATIONS

MediaTek, Per UE PHR for carrier aggregation 3GPP TSG-RAN WG1 Meeting #61bis R1-103743 Dresden, Germany, Jun. 28-Jul. 2, 2010, pp. 1-4.*

(Continued)

*Primary Examiner* — Ahmed Elallam
(74) *Attorney, Agent, or Firm* — Lee, Hong, Degerman, Kang & Waimey

(57) ABSTRACT

The disclosure relates to a method for a user equipment to report a transmission power capability to an e Node B. The user equipment operates in carrier aggregation. The method comprises determining, by the user equipment, that the transmission power capability of at least one power amplifier of the user equipment reaches at least one defined threshold, and triggering a generation of a power headroom report based on the determining step. The disclosure also relates to the corresponding user equipment and e Node B.

10 Claims, 6 Drawing Sheets

(56) References Cited

U.S. PATENT DOCUMENTS

| | | | |
|---|---|---|---|
| 2010/0173665 A1* | 7/2010 | Michel et al. | 455/522 |
| 2010/0238863 A1 | 9/2010 | Guo et al. | |
| 2010/0273515 A1* | 10/2010 | Fabien et al. | 455/509 |
| 2010/0273520 A1* | 10/2010 | Pelletier et al. | 455/522 |
| 2011/0081936 A1* | 4/2011 | Haim et al. | 455/522 |
| 2011/0199921 A1* | 8/2011 | Damnjanovic et al. | 370/252 |
| 2011/0199949 A1* | 8/2011 | Lee et al. | 370/311 |
| 2011/0237288 A1* | 9/2011 | Ratasuk et al. | 455/522 |
| 2011/0319120 A1* | 12/2011 | Chen et al. | 455/522 |
| 2012/0083308 A1* | 4/2012 | Wang et al. | 455/522 |
| 2012/0113834 A1* | 5/2012 | Hunzinger | 370/252 |
| 2012/0281568 A1* | 11/2012 | Ho et al. | 370/252 |

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 9)," 3GPP TS 36.321 V9.3.0, Jun. 2010, 48 pages (relevant portions: sections 5 and 6).

HTC, "Power Headroom Reporting," R1-102732, 3GPP TSG-RAN WG1 #61, May 2010, 3 pages.

PCT International Application No. PCT/KR2011/007306, Notification of Transmittal of the International Search Report and the Written Opinion of the International Searching Authority, or Declaration dated Apr. 23, 2012, 9 pages.

* cited by examiner

POWER LIMITED CASE SIGNALING

CROSS-REFERENCE TO RELATED APPLICATIONS

This application is the National Stage filing under 35 U.S.C. 371 of International Application No. PCT/KR2011/007306, filed on Oct. 4, 2011, which claims the benefit of U.S. Provisional Application Ser. No. 61/389,663, filed on Oct. 4, 2010, the contents of which are all hereby incorporated by reference herein in their entirety.

The disclosure relates to power headroom reporting, in particular in the context of carrier aggregation management in a radiocommunication system.

BACKGROUND ART

Many different types of radiocommunication systems (i.e. networks) exist. GSM, UMTS, LTE and LTE-advanced are non-limiting examples of such radiocommunication systems.

FIG. 1 is a block diagram showing a radiocommunication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT(mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user data or control data can be used between BSs 20 (in the present document, the term "data" is used as a synonymous for "traffic" and does not imply any limitation as to the nature of such data, which can refer e.g. to user traffic or control traffic i.e. signaling). The BSs 20 are interconnected with each other by means of an X2 interface. The BSs 20 are also connected by means of the S1 interface to the EPC (Evolved Packet Core). They may interface to the aGW (E-UTRAN Access Gateway) via the S1. In the example shown in FIG. 1, the BSs 20 are more specifically connected to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

FIG. 2 gives an overview of the E-UTRAN architecture where:

- eNB, aGW Control Plane and aGW User Plane boxes depict the logical nodes;
- The boxes within the eNB box from RRC to Inter Cell RRM as well as the boxes SAE Bearer Control and MM Entity within the aGW Control Plane box depict the functional entities of the control plane; and
- The boxes within the eNB box from PHY to RLC depict the functional entities of the user plane.

Functions agreed to be hosted by the eNB are: Selection of aGW at attachment; Routing towards aGW at RRC activation; Scheduling and transmission of paging messages; Scheduling and transmission of BCCH information; Dynamic allocation of resources to UEs in both uplink and downlink; The configuration and provision of eNB measurements; Radio Bearer Control; Radio Admission Control; Connection Mobility Control in LTE_ACTIVE state.

Functions agreed to be hosted by the aGW are: Paging origination; LTE_IDLE state management; Ciphering of the user plane; PDCP; SAE Bearer Control; Ciphering and integrity protection of NAS signaling.

FIG. 3 shows the user-plane protocol stack for E-UTRAN.

RLC (Radio Link Control) and MAC (Medium Access Control) sublayers (terminated in eNB on the network side) perform the functions such as Scheduling, ARQ (automatic repeat request) and HARQ (hybrid automatic repeat request).

PDCP (Packet Data Convergence Protocol) sublayer (terminated in aGW on the network side) performs for the user plane functions such as Header Compression, Integrity Protection, Ciphering.

FIG. 4 shows the control-plane protocol stack for E-UTRAN. The following working assumptions apply.

RLC and MAC sublayers (terminated in eNB on the network side) perform the same functions as for the user plane;

RRC (Radio Resource Control) (terminated in eNB on the network side) performs the functions such as: Broadcast; Paging; RRC connection management; RB control; Mobility functions; UE measurement reporting and control.

PDCP sublayer (terminated in aGW on the network side) performs for the control plane the functions such as: Integrity Protection; Ciphering.

NAS (terminated in aGW on the network side) performs among other things: SAE bearer management; Authentication; Idle mode mobility handling; Paging origination in LTE_IDLE; Security control for the signaling between aGW and UE, and for the user plane.

RRC Uses the Following States:

1. RRC_Idle:

UE specific DRX configured by NAS; Broadcast of system information; Paging; Cell re-selection mobility; The UE shall have been allocated an id which uniquely identifies the UE in a tracking area; No RRC context stored in the eNB.

2. RRC_Connected:

UE has an E-UTRAN-RRC connection; UE has context in E-UTRAN; E-UTRAN knows the cell which the UE belongs to; Network can transmit and/or receive data to/from UE; Network controlled mobility (handover); Neighbour cell measurements; At RLC/MAC level: UE can transmit and/or receive data to/from network; UE also reports channel quality information and feedback information to eNB.

The network signals UE specific paging DRX (Discontinuous Reception) cycle. In RRC Idle mode, UE monitors a paging at a specific paging occasion of every UE specific paging DRX cycle. The paging occasion is a time interval where a paging is transmitted. UE has its own paging occasion. A paging message is transmitted over all cells belonging to the same tracking area. If UE moves from a tracking area to another tracking area, UE will send a tracking area update message to the network to update its location.

A physical channel transfers signaling and data between UE L1 and eNB L1. As shown in FIG. 5, the physical channel transfers them with a radio resource which consists of one or more sub-carriers in frequency and one more symbols in time. 6 or 7 symbols constitute one sub-frame which is 0.5 ms in length. The particular symbol(s) of the sub-frame, e.g. the first symbol of the sub-frame, can be used for the PDCCH (Physical Downlink Control Channel). PDCCH channel carries L1 signaling.

A transport channel transfers signaling and data between L1 and MAC layers. A physical channel is mapped to a transport channel.

Downlink transport channel types are:

1. Broadcast Channel (BCH) used for transmitting system information
2. Downlink Shared Channel (DL-SCH) characterised by: support for HARQ; support for dynamic link adaptation by varying the modulation, coding and transmit power; possibility to be broadcast in the entire cell; possibility to use beamforming; support for both dynamic and semi-static resource allocation
3. Paging Channel (PCH) used for paging a UE
4. Multicast Channel (MCH) used for multicast or broadcast service transmission.

Uplink transport channel types are:

1. Uplink Shared Channel (UL-SCH) characterised by: possibility to use beamforming; (likely no impact on specifications); support for dynamic link adaptation by varying the transmit power and potentially modulation and coding; support for HARQ
2. Random Access Channel(s) (RACH) used normally for initial access to a cell.

The MAC sublayer provides data transfer services on logical channels. A set of logical channel types is defined for different kinds of data transfer services as offered by MAC. Each logical channel type is defined by what type of information is transferred.

A general classification of logical channels is into two groups:

Control Channels (for the transfer of control plane data);
Traffic Channels (for the transfer of user plane data).

Control channels are used for transfer of control plane data only. The control channels offered by MAC are:

Broadcast Control Channel (BCCH)
A downlink channel for broadcasting system control information
Paging Control Channel (PCCH)
A downlink channel that transfers paging information. This channel is used when the network does not know the location cell of the UE.
Common Control Channel (CCCH)
this channel is used by the UEs having no RRC connection with the network.
Multicast Control Channel (MCCH)
A point-to-multipoint downlink channel used for transmitting MBMS control data from the network to the UE.
Dedicated Control Channel (DCCH)
A point-to-point bi-directional channel that transmits dedicated control data between a UE and the network. Used by UEs having an RRC connection.

Traffic channels are used for the transfer of user plane data only. The traffic channels offered by MAC are:

Dedicated Traffic Channel (DTCH)
A Dedicated Traffic Channel (DTCH) is a point-to-point channel, dedicated to one UE, for the transfer of user data. A DTCH can exist in both uplink and downlink.
Multicast Traffic Channel (MTCH)
A point-to-multipoint downlink channel for transmitting traffic data from the network to the UE.

In Uplink, the following connections between logical channels and transport channels exist:

DCCH can be mapped to UL-SCH;
DTCH can be mapped to UL-SCH.

In Downlink, the following connections between logical channels and transport channels exist:

BCCH can be mapped to BCH;
PCCH can be mapped to PCH;
DCCH can be mapped to DL-SCH;
DTCH can be mapped to DL-SCH;
MCCH can be mapped to MCH;
MTCH can be mapped to MCH;

Conventionally, only one carrier (e.g. a frequency band) is used at a time with respect to a given UE for transporting data, such as useful data and/or control data.

But for supporting wider transmission bandwidths, it would be better to use carrier aggregation, that is simultaneous support of multiple carriers. Carrier aggregation would thus involve transporting data, such as useful data and/or control data, over a plurality of carriers with respect to a given UE. It would thus enhance the conventional carrier usage and be adapted to the multiple access type of the considered radio communication system.

As far as LTE is concerned, carrier aggregation has been introduced in a recent version thereof, so-called LTE-Advanced, which extends LTE Release 8 (LTE Rel-8). Some aspects of carrier aggregation are disclosed for example in 3GPP TR 36.814 V0.4.1, 3rd Generation Partnership Project; Technical Specification Group Radio Access Network; Further Advancements for E-UTRA Physical Layer Aspects (Release 9) released in February 2009 (see section 5 in particular), as well as in subsequent versions thereof. Other standard documents, which are well known by one skilled in the art, relate to other aspects of carrier aggregation.

Thus LTE-Advanced allows having two or more carriers, so-called component carriers (CCs), aggregated in order to support wider transmission bandwidths e.g. up to 100 MHz and for spectrum aggregation.

In contrast with an LTE Rel-8 terminal, an LTE-Advanced terminal with reception and/or transmission capabilities for carrier aggregation can simultaneously receive and/or transmit on multiple component carriers.

According to a non-limiting example, a carrier may be defined by a bandwidth and a center frequency. If five carriers are assigned as granularity of carrier unit having a 5 MHz bandwidth, carrier aggregation may lead to a bandwidth of a maximum of 20 MHz.

Contiguous spectrum aggregation and/or non-contiguous spectrum aggregation may take place. The contiguous spectrum aggregation uses contiguous carriers and the non-contiguous spectrum aggregation uses non-contiguous carriers. The number of aggregated carriers may be different in uplink and downlink. When the number of downlink carriers and that of uplink carriers are equal, it is called a symmetric aggregation, and when the numbers are different, it is called an asymmetric aggregation.

The size (i.e., the bandwidth) of multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

FIG. 6 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate e.g. in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control data such as HARQ ACK/NAK in response to downlink transmission, scheduling request and channel quality indicator (CQI). A physical uplink shared channel (PUSCH) carries uplink shared channel (UL-SCH).

Each component carrier may have its own control channel, i.e. PDCCH. Alternatively, only some component carriers may have an associated PDCCH, while the other component carriers do not have their own PDCCH.

Component carriers may be divided into a primary component carrier (PCC) and one or several secondary component carriers (SCCs) depending on whether they are activated. A PCC may be constantly activated, and an SCC may be activated or de-activated according to particular conditions. Activation means that transmission or reception of traffic data is performed or traffic data is ready for its transmission or reception. Deactivation means that transmission or reception of traffic data is not permitted. In the deactivation, measurement is made or minimum information can be transmitted or received. The UE generally uses only a single PCC and possibly one or more SCCs along with the PCC.

A PCC is a component carrier used by a BS (i.e. an eNB in the context of LTE/LTE-A) to exchange traffic and PHY/MAC control signaling (e.g. MAC control messages) with a UE. SCCs carriers are additional component carriers which the UE may use for traffic, only per BS's specific commands and rules received e.g. on the PCC. The PCC may be a fully configured carrier, by which major control data is exchanged between the BS and the UE. In particular, the PCC is configured with PDCCH. The SCC may be a fully configured component carrier or a partially configured component carrier, which is allocated according to a request of the UE or according to an instruction of the BS. The PCC may be used for entering of the UE into a network or for an allocation of the SCC. The primary carrier may be selected from among fully configured component carriers, rather than being fixed to a particular component carrier. A component carrier set as an SCC carrier may be changed to a PCC.

A PCC may further have at least some of the following characteristics:
  to be in accordance with the definitions of the PCC introduced in Rel-10 CA;
  uplink PCC and downlink PCC may be configured per UE;
  uplink PCC may be used for transmission of L1 uplink control data;
  downlink PCC cannot be de-activated;
  re-establishment may be triggered when the downlink PCC experiences RLF (radio link failure), not when other downlink CC's experience RLF;
  SI (system information) reception for the downlink PCC, Rel-8 procedures may apply;
  this may not imply anything for the reception of the SI of other configured CC's;
  NAS information may be taken from the downlink PCC cell.

In LTE FDD (frequency division duplex) system, DL (downlink) and UL (uplink) carrier are always paired, i.e. there is a one-to-one association/linkage between the DL and UL carrier. In LTE-Advanced system with carrier aggregation, several component carriers are aggregated to provide higher peak data rate. The transmission on multiple CCs with symmetric or asymmetric DL/UL component carriers are both supported.

The UE DL Component Carrier Set is defined as the set of DL component carriers configured by dedicated signalling on which a UE may be scheduled to receive the PDSCH (Physical Downlink Shared Channel) in the DL.

The PDCCH Monitoring Set is defined as a set of DL CCs on which the UE is required to monitor the PDCCH (Physical Downlink Control Channel). Its size is less than or equal to the size of the UE DL CC set and it comprises only CCs that are in the UE DL CC set.

Power headroom reports (PHR) provides information to the eNB on how close the UE is operating to its maximum transmission power capabilities. This information is needed for packet scheduling and link adaptation. For example, being aware of the fact that a UE is operating at its maximum transmission power, the eNB can also know that allocating more physical resource blocks to that UE will results in a drop of its experienced SINR (Signal to Interference-plus-Noise Ratio). In carrier aggregation, if there is more than one UL CC, individual power headroom reporting is necessary.

In Rel-8/9, there was only one carrier. Accordingly, in Rel-8/9, per CC PHR is used. However, in Rel-10, transmitted power can be distributed to multiple CCs (component carriers). Therefore, in Rel-10, even if all CCs report their PHR at the same time, the eNB is not able to calculate the true Power Headroom (PH) for a UE, since there may different RF architecture, for example single Power Amplifier (PA) or multiple PA, and/or power reduction MPR or power scaling at UE which is unknown to the eNB.

A configured transmitted power (referred to as $P_{CMAX}$) requirement defines a range for the maximum output power for UE uplink transmission due to several relaxations and restrictions. PCMAX is set within the following bounds:

$$P_{CMAX\_L} \leq P_{CMAX} \leq P_{CMAX\_H}$$

Where:

$$P_{CMAX\_L} = MIN\{P_{EMAX} - \Delta T_C, P_{PowerClass} - MPR - A - MPR - \Delta T_C\}$$

$$P_{CMAX\_H} = MIN\{P_{EMAX}, P_{PowerClass}\}$$

Where:

$P_{EMAX}$ is the value given by higher layers to IE P-Max. It is signalled when cell-phone power reduction is mandatory or desired (e.g. in a Hospital area, the network may require the UE to use a given PEMAX in order to reduce potentially hazardous electro-magnetic radiations) if signalled the maximum output power is reduced by IE P-Max.

$P_{PowerClass}$ is the maximum UE power specified (e.g. 23 dBm). Each type of UE has its own power class (20 dBm, 21 dBm, etc.), which is an intrinsic property of the UE (which may depend on factors such as the type of battery of the UE, the type(s) of power amplifier(s) of the UE, power consumption of miscellaneous components such as LCD, etc.).

$\Delta T_C$ is maximum output power tolerance relaxation when transmission bandwidth is configured at band edge.

MPR and A-MPR are the allowed maximum and additional power reduction due to higher order modulation and transmit bandwidth configuration. The two parameters MPR and A-MPR are not accurately specified as of the priority date of the present application. It is only specified that they should each be in a range between 0 dB and 2 dB. This might create uncertainties with respect to $P_{CMAX\_L}$.

It can be noted that the power reduction can be less than or equal to the MPR/A-MPR value. Then the exact power reduction is UE implementation dependent and is not known by the eNB.

In the most frequent deployment scenarios, IE P-Max is not signalled and transmission bandwith is not configured at band edge. In such case:

For UEs which do not implement support for MPR/A-MPR, $P_{CMAX\_L} = P_{CMAX\_H}$ For UEs which implement support for considering the power reduction, the maximum difference between $P_{CMAX}\_L$ and $P_{CMAX}\_H$ is the value MPR+A-MPR.

The Power Headroom reporting procedure is used to provide the serving eNB with information about the difference between the configured maximum UE output power ($P_{CMAX}$), and the estimated power for PUSCH transmission ($P_{PUSCH}$). In LTE-A, transmitting power can be distributed to multiple CCs. A problem may occur when simultaneous transmissions occur among multiple CCs, as the eNB may be unaware of the exact amount of available power of the UE and unaware of how such available power is distributed among CCs. With state of the art definition of per CC PHR comparing the estimated power to Pcmax,c of the UL CC, there may be situations in which the UE still reports positive value even if it has to perform power reduction because of the UE power limitation. For example a power headroom report PHR1 for a component carrier CC1 may indicate that the UE still has the ability to amplify the signal further by X1 dBs, and a power headroom report PHR2 for a component carrier CC2 may indicate that the UE still has the ability to amplify the signal further by X2 dBs, but if both CCs (CC1 and CC2) are served by the same power amplifier, X1 and X2 indications are misleading (as the single power amplifier can't amplify simultaneously by X1 on one CC and X2 on the other CC).

DISCLOSURE OF INVENTION

Technical Problem

Simultaneous transmission on multiple CCs typically implies that scheduling strategy would allocate as many resource blocks as possible during a subframe that the UE has enough data to transmit. This typically implies that a UE will often transmit with power close to its maximum power. However, the UE become may be power limited. For example, allocated resource blocks may be larger than what is permitted as per the maximum permitted power. In such cases the UE may have to apply power scaling, which may cause performance degradation, the power received being lower than expected.

Solution to Problem

To improve this situation, the invention proposes a method for a user equipment to report a transmission power capability to an e Node B, wherein the user equipment operates in carrier aggregation. The method comprises determining, by the user equipment, that the transmission power capability of at least one power amplifier of the user equipment reaches at least one defined threshold. The method further comprises triggering a generation of a power headroom report based on the determining step.

The invention also relates to a user equipment configured for carrier aggregation with an e Node B. The user equipment comprises a processor for determining, by the user equipment, that the transmission power capability of at least one power amplifier of the user equipment reaches at least one defined threshold, and for triggering a generation of a power headroom report based on the determination. The user equipment further comprises a transmitter for sending the power headroom report to the e Node B. The user equipment is accordingly adapted for implementing a method according to possible embodiments of the invention.

The invention also proposes an e Node B arranged to carry out carrier aggregation with a user equipment. The e Node B comprises a receiver for obtaining from the user equipment a power headroom report for each of the component carriers that are aggregated, and a power headroom report indicating that the transmission power capability of at least one power amplifier of the user equipment has reached at least one defined threshold. The e Node B is accordingly adapted for implementing a method according to possible embodiments of the invention.

Advantageous Effects of Invention

This method is advantageous in particular in that it enables triggering, from a user equipment, the transmission of a power headroom report on the basis of predefined conditions (based on one or more thresholds), and better informing the network (e.g. an e Node B), in the context of carrier aggregation, about the amplification capabilities in the UE at a given point in time. The e Node B can, accordingly, make relevant scheduling decisions. The predefined conditions may advantageously be set by the network (e.g. by an e Node B sending the desired thresholds to the UE).

BRIEF DESCRIPTION OF DRAWINGS

Embodiments of the present invention are illustrated by way of example, and not by way of limitation, in the figures of the accompanying drawings, in which like reference numerals refer to similar elements and in which.

BEST MODE FOR CARRYING OUT THE INVENTION

The invention will be described hereafter in the context of an LTE-A system supporting carrier aggregation as mentioned above. It applies however to any other type of system including at least one base station and at least one UE or equivalent, as will be apparent to one skilled in the art.

Figure 1:
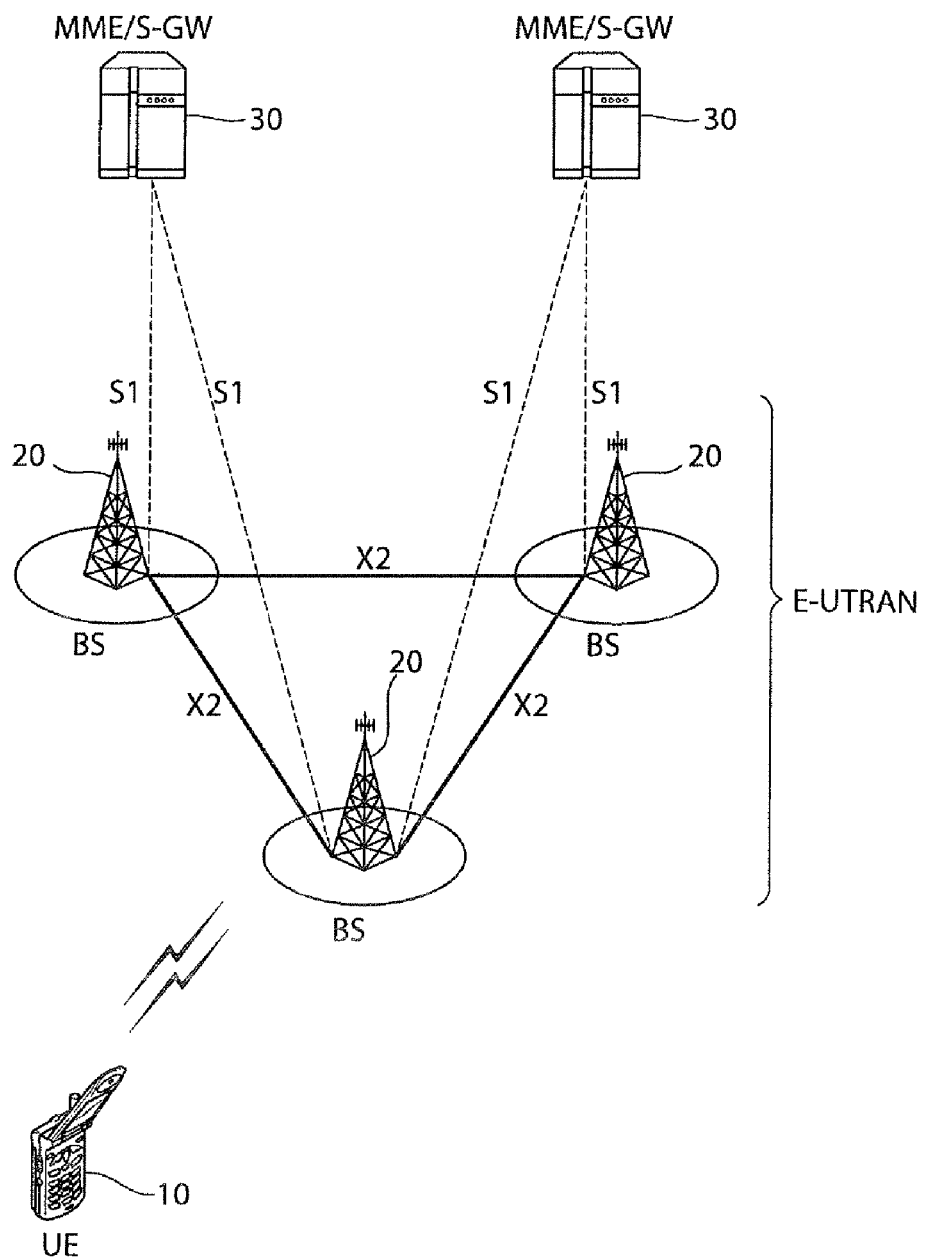
FIG. 1 is a diagram showing an exemplary radiocommunication system.
Figure 2:
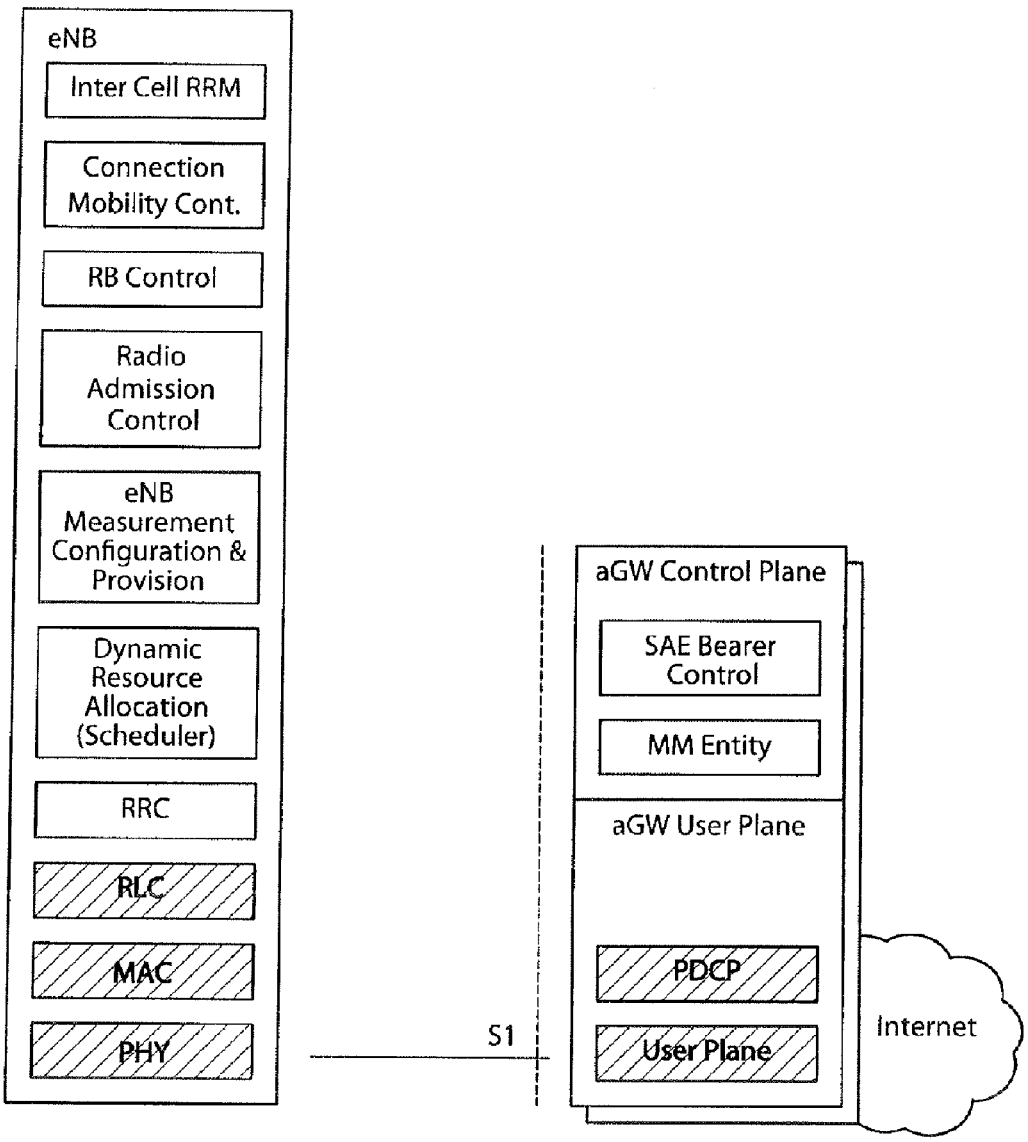
FIG. 2 is a diagram showing an exemplary overview of an E-UTRAN architecture.
Figure 3:
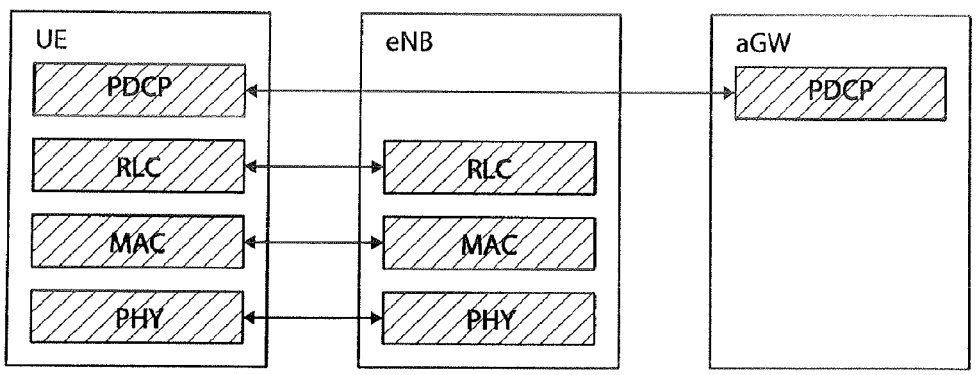
FIG. 3 is a diagram showing an exemplary user-plane protocol stack for E-UTRAN.
Figure 4:
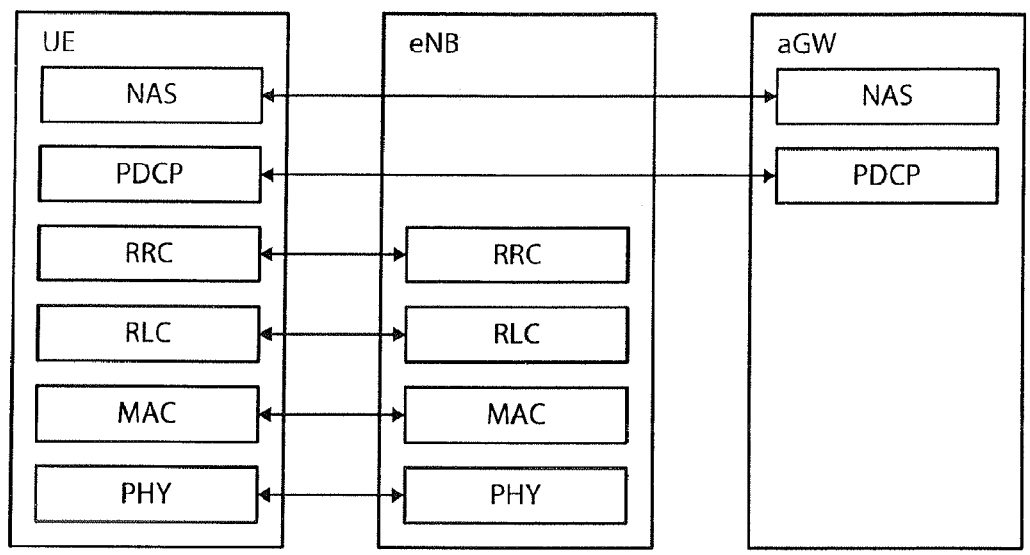
FIG. 4 is a diagram showing an exemplary control-plane protocol stack for E-UTRAN.
Figure 5:
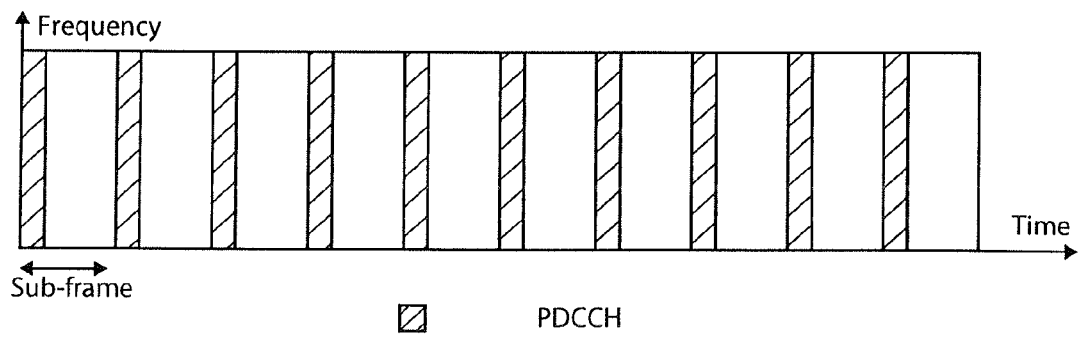
FIG. 5 is a diagram schematically showing a PDCCH channel arrangement.
Figure 6:
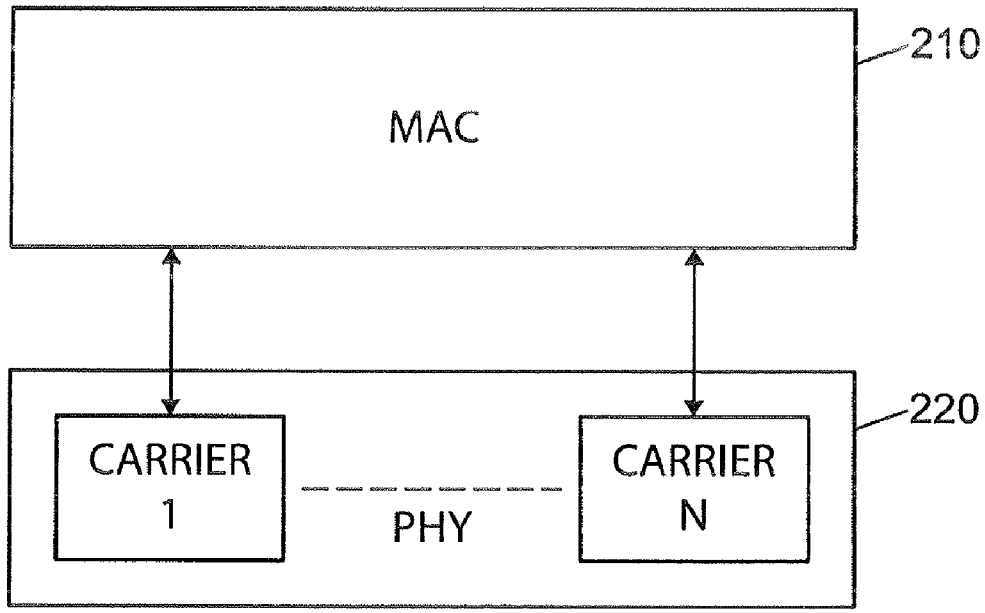
FIG. 6 is a diagram showing an exemplary protocol structure for supporting multiple carriers (carrier aggregation)
Figure 7:
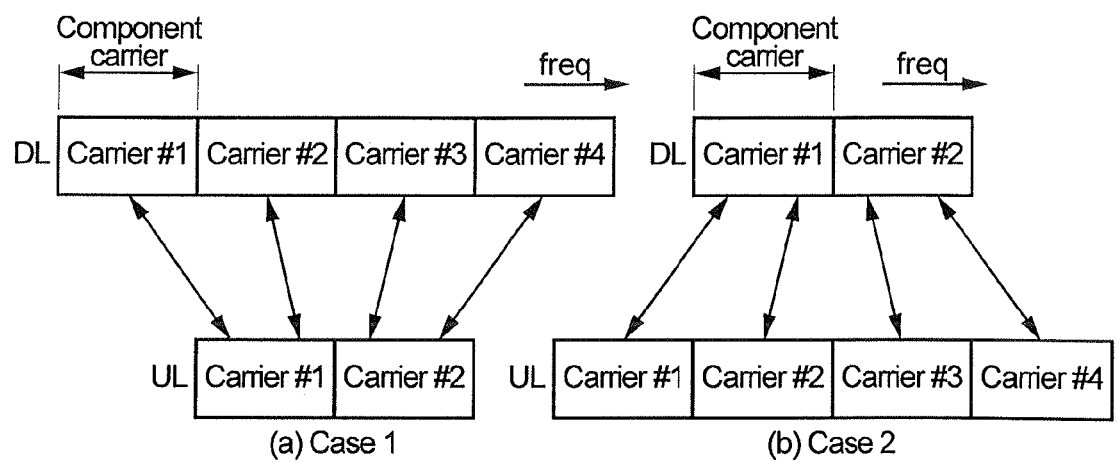
FIG. 7 illustrates reference models for asymmetric DL/UL carrier aggregation.
Figure 8:
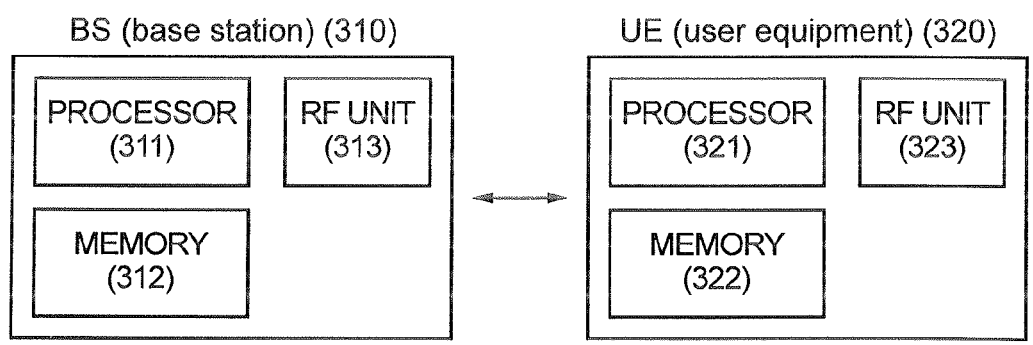
FIG. 8 illustrates an exemplary and non-limiting wireless communication system.

FIG. 8 shows an exemplary and non-limiting wireless communication system including a BS 310 and one or more UE(s) 320. In downlink, a transmitter may be a part of the BS 310, and a receiver may be a part of the UE 320. In uplink, a transmitter may be a part of the UE 320, and a receiver may be a part of the BS 310. The BS 310 may include a processor 311, a memory 312, and a radio frequency (RF) unit 313. The processor 311 may be configured to implement proposed procedures and/or methods described in the present document. In the exemplary system of FIG. 8, the memory 312 is coupled with the processor 311 and stores a variety of information to operate the processor 311. The RF unit 313 is coupled with the processor 311 and transmits and/or receives a radio signal.

The UE 320 may include a processor 321, a memory 322, and a RF unit 323. The processor 321 may be configured to implement proposed procedures and/or methods described in the present document. The memory 322 is coupled with the processor 321 and stores a variety of information to operate the processor 321. The RF unit 323 is coupled with the processor 321 and transmits and/or receives a radio signal.

The BS 310 and/or the UE 320 may have single antenna or multiple antennas. When at least one of the BS 310 and the UE 320 has multiple antennas, the wireless communication system may be called a multiple input multiple output (MIMO) system.

The BS 310 and the UE 320 support carrier aggregation, meaning that they may use multiple component carriers (CCs).

Among the multiple CCs, one or several CCs may be configured with a Physical Downlink Control Channel, PDCCH, received by the UE 320 from the BS 310. The PDCCH configured on a given CC may be arranged for scheduling resources on a physical shared channel, e.g. a PDSCH or PUSCH, to the UE 320 on said given CC only. It may also be arranged for scheduling resources on a physical shared channel, e.g. a PDSCH or PUSCH, to the UE 320 on at least one other CC among the multiple CCs (only or in addition to scheduling resources on a physical shared channel on said given CC).

One solution could have been, when the UE performs power scaling, to have the UE triggers a PHR to report negative power headroom values indicating how much power reduction has been applied. However this would not prevent the UE from power scaling. Therefore, it is proposed to assist the eNB (e Node B) in finding out when the UE is close to its power limit. The knowledge of the UE power class and the reported PHR can help the eNB in roughly estimating how and to what extent the UE power is limited. However the estimation error is in the order of MPR+A-MPR. The exact power reduction (MPR+A-MPR) is UE implementation dependent, for example it may depend on the modulation scheme used in the UE and/or on the resource allocation size. In general, the PHR in subframe i cannot be directly used in a later subframe j, since there might be different scheduling decisions implying different possible MPR/A-MPR values in the two subframes.

According to a possible embodiment, a new PHR trigger criterion is introduced, wherein a UE sends a power headroom report when it is close to its power limitation. This report may be send by the UE when the UE detects that its transmission power is X dB below the maximum UE power, where X is power limit parameter defined to be in order of (MPR+A-MPR), for example X can take values [0, 1, 2, 3, 4, . . . Inf.] in dBs.

A possible embodiment relates to a method for a user equipment to report a transmission power capability to an e Node B. The user equipment operates in carrier aggregation. Therefore, a conventional power headroom report per component carrier is not necessarily indicative of the remaining power amplification capacity of the user equipment. The method comprises determining, by the user equipment, that the transmission power capability of at least one power amplifier of the user equipment reaches at least one defined threshold. The threshold may be pre-stored in the user equipment, e.g. at manufacturing time, or when/if the user equipment is personalized (e.g. SIM locked, etc.) for a given network operator. The threshold may also be sent to the user equipment from the network (e.g. from an e Node B), in which case the received threshold value may optionally replace (update) a pre-existing threshold value, or complement such threshold value (in which case there are several thresholds). The method further comprises triggering a generation of a power headroom report based on the above determining step. When the UE has several thresholds, the method may, each time one of the thresholds is reached, trigger a respective power headroom report. Accordingly, the network may be informed each time the user equipment gets closer (by a degree associated with each threshold) to a maximum capacity. When there are several amplifiers, there may be one or more thresholds for each amplifier. Each set of thresholds is then checked with respect to the corresponding amplifier.

The above determination that a transmission power capability reaches a threshold and the above triggering of power headroom report may be implemented, for example, with a computer program executed by a processor of the user equipment. Such reporting could also be implemented with hardwired logic inside the user equipment, FPGAs, etc. The program (or other alternatives such as hardwired logic/FPGAs) may, for example, direct the user equipment to monitor current parameters of transmission power capability and compare them with thresholds stored in a memory (such as RAM, EEPROM, Flash, ROM, etc.) of the user equipment, and may instruct the user equipment to report such PHR to the e Node B (as opposed to a general purpose I/O program which would merely transmit data upon external instruction).

According to a possible embodiment, the method further comprises transmitting a power headroom report for each of the component carriers that are aggregated. This is advantageous as it improves the ability of the network (e.g. e Node B) to accurately assess the power amplification capabilities of the user equipment. Accordingly, the e Node B can itself optimize its own decisions with respect to communications with the user equipment at stake, and other user equipments.

According to a possible embodiment, the user equipment uses a same power amplifier for at least two component carriers. Accordingly, the power amplification capability of such amplifier (or amplifiers, in case many amplifiers are associated individually with several component carriers) is split among several component carriers, and the power amplification that remains available is to be shared between them.

According to a possible embodiment, the user equipment uses a different power amplifier for each component carrier. Since there are at least two component carriers (due to carrier aggregation), the user equipment embeds at least two amplifiers each serving a single component carrier. Accordingly, the power amplification capability of the user equipment is split among several amplifiers, and the power amplification that remains available overall for the whole user equipment is not necessarily indicative, when taken alone, of the available power amplification capacity for each component carrier.

According to a possible embodiment, at least one defined threshold of the user equipment is received by the user equipment from the e Node B, which may accordingly decide when to be notified of certain amplification levels for each user equipment served by the e Node B by defining such thresholds. In some instances, it might be desirable to limit the electromagnetic radiations in an area served by such e Node B, and such limitation may be important enough to justify setting multiple thresholds in order to make sure the maximum authorized amount is never exceeded. In other instances, it might be desired to guarantee a very high level of network availability, and accordingly to carefully monitor the power amplification capacity of the served by the e Node B by setting multiple thresholds. In other instances, it might be desired to reduce the load of notifications (number of PHR triggered according to a method according to possible embodiments of the invention) received by the e Node B, by setting a small number of thresholds per user equipment (or even a single threshold). The value of such threshold can be adapted either to be very close to the maximum available amplification power (thereby limiting the number of PHRs triggered and accordingly the load on the e Node B), or on the contrary to take a substantial margin thereby notifying the e Node B well in advance when the remaining amplification power of a user equipment risks becoming too low.

According to a possible embodiment, the power headroom report includes information about how close the user equipment is operating to its total maximum transmission power capabilities including power required for all component carriers. This provides more information to the e Node B and assists the e Node B in particular in taking proper decisions, such as power management decisions, handover decisions, etc.

According to a possible embodiment, the method comprises defining several thresholds such that when the transmission power capability of the at least one power amplifier reaches any of the thresholds, the method provides information to the e Node B on how close the at least one power amplifier is operating to its maximum transmission power capabilities. Certain thresholds may apply to multiple amplifiers of the user equipment. This is advantageous, in particular when the amplifiers concerned are similar (in which case, at least for such amplifiers and such thresholds, there is no need to manage such thresholds on a per amplifier basis). In such case, synchronization issues are avoided, i.e. there is no need to make sure, when a threshold is updated, that the other ones are updated as well, as it is advantageously possible to use not only a single threshold value but also a single threshold variable (i.e. updating the single threshold variable necessarily applies to all respective amplifiers). Of course, the fact that certain thresholds are shared does not preclude the existence of additional, specific thresholds, even for the same amplifiers. For example amplifiers AMP1 and AMP2 may use a common threshold TH, but AMP1 may additionally have a dedicated threshold TH1, and AMP2 may additionally have a dedicated threshold TH2. In a possible embodiment, all thresholds are shared by all amplifiers.

Figure 9:
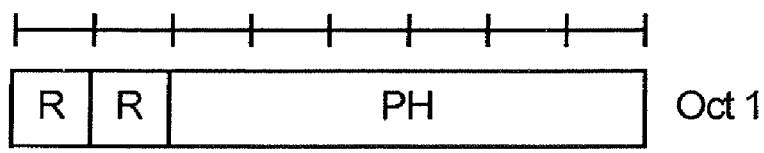
FIG. 9 illustrates a power headroom MAC control element according to state of the art as of the priority date of the present application.
Figure 11:
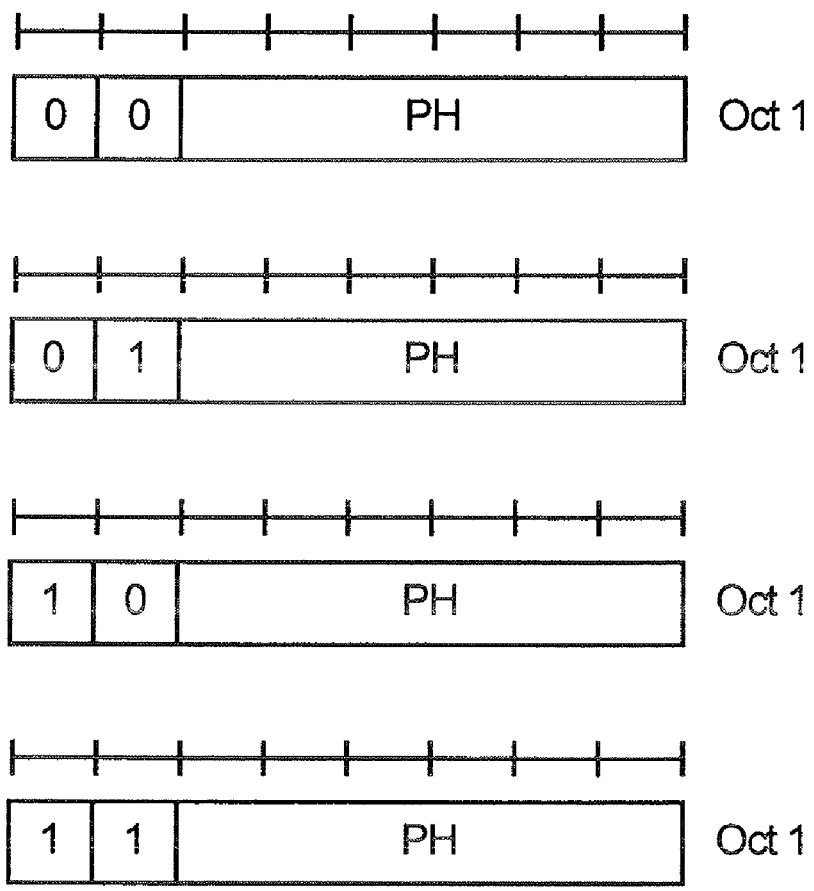
FIG. 11 illustrates a power headroom MAC control element according to another possible embodiment of the invention.

According to a possible embodiment, the power headroom report follows the LTE release 8 format, modified by affecting values identifying each of the defined thresholds to some of the bits of the said format. The LTE release 8 format is illustrated on FIG. 9, which shows a relevant part of the format, namely the power headroom MAC control element (a fixed size field consisting of a single octet). This power headroom MAC control element is a byte in which the first two bits (denoted RR, R for Reserved) are reserved, and the next six bits (denoted PH, PH for power headroom) indicate the power headroom level. The reported PH and the corresponding power headroom can be found in subclause 9.1.8.4 of 3GPP TS 36.133. Accordingly the two reserved bits RR may be used to indicate the value of a power limited parameter X. X is the value, in dB, of the difference between the current power of the UE (which is necessarily below the maximum UE power) and the maximum UE power. It is possible to decide that RR=00 means that X=0 dB, RR=01 means that X=1 dB, RR=10 means that X=2 dB and RR=11 means that X=3 dB, however in practice it is more convenient to define four possible value of X (the values do not need to be linearly spaced), the values being chosen so as to be most representative of four relevant levels of power below the maximum possible power. The four possible values of RR can then be mapped to the four chosen values of X, as illustrated on FIG. 11.

In a possible embodiment, rather than following the full LTE release 8 format, the power headroom report merely follows the format of the power headroom MAC control element as detailed above, other fields being freely modified.

Figure 10:
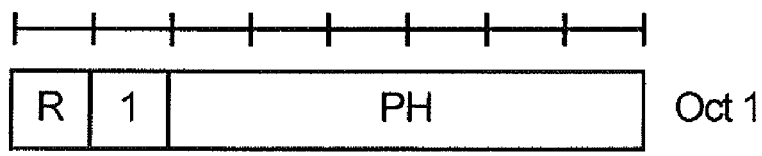
FIG. 10 illustrates a power headroom MAC control element according to a possible embodiment of the invention.

According to a possible embodiment, the power headroom report includes a bit to indicate whether the power headroom report is the power headroom report which is based on the determining step. As illustrated on FIG. 10, the bit could be the second bit R (of the two bits RR), however it is possible to use the first bit as well (as long as the adopted convention is the same both on UE side and e Node B side, or at least as long as the e Node B knows where the UE writes the bit). The bit may be set to 1 in order to indicate that the power headroom report is the power headroom report which is based on the determining step (the step determining that the transmission power capability of at least one power amplifier of the user equipment reaches at least one defined threshold), while the bit may be set to 0 in order to indicate that the power headroom report is a power headroom report for one of the component carriers that are aggregated, and that is sent either based on state of the art triggering conditions or simply automatically sent together with the PHR sent due to the newly proposed triggering condition. Of course the choice of the values 0 and 1 is arbitrary and can be swapped (any convention is usable).

A possible embodiment relates to a computer program arranged to carry out the method according to a possible embodiment when such computer program is executed by a processor. The computer program may be written for example in C language, in assembly language, in Java, C#, C++, Basic, or any other suitable language.

A possible embodiment relates to a non-transitory computer-readable storage medium storing the above computer program. This can be a memory such as a RAM, ROM, EEPROM, or Flash, for example.

According to a possible embodiment, a user equipment is configured for carrier aggregation with an e Node B. The user equipment comprises:

a processor for determining, by the user equipment, that the transmission power capability of at least one power amplifier of the user equipment reaches at least one defined threshold, and for triggering a generation of a power headroom report based on the determination, and a transmitter for sending the power headroom report to the e Node B.

The processor is associated with a memory storing a computer program arranged to carry out the above task. The transmitter is associated with a memory storing a computer program arranged to instruct the transmitter to send the power headroom report.

According to a possible embodiment, an e Node B is arranged to carry out carrier aggregation with a user equipment, the e Node B comprising a receiver for obtaining from the user equipment:

a power headroom report for each of the component carriers that are aggregated, and a power headroom report indicating that the transmission power capability of at least one power amplifier of the user equipment has reached at least one defined threshold.

The receiver is associated with a memory storing a computer program arranged to instruct the receiver to receive and process the power headroom report. For example, the computer program may inspect the bits RR of the PHR in order to determine whether it is a PHR according to a possible embodiment and accordingly take appropriate action.

Industrial Applicability

The e Node B may be arranged to set and transmit the at least one defined threshold to the user equipment.

The invention claimed is:

1. A method for a user equipment to report a transmission power capability to an e Node B, wherein the user equipment operates in carrier aggregation, the method comprising:

determining, by the user equipment, that the transmission power capability of at least one power amplifier of the user equipment reaches at least one defined threshold, and when a criterion that transmission power is (MPR (Maximum Power Reduction)+A-MPR (Additional Maximum Power Reduction)) dB below a total maximum transmission power capabilities including power required for all component carriers is satisfied, triggering a generation of a power headroom report based on the determining step, wherein if the power headroom report is triggered according to the criterion, the user equipment does not perform power scaling.

2. The method according to claim 1, further comprising:
transmitting the power headroom report for each of the component carriers that are aggregated.

3. The method according to claim 1, wherein the user equipment uses a same power amplifier for at least two component carriers.

4. The method according to claim 1, wherein the user equipment uses a different power amplifier for each component carrier.

5. The method according to claim 1, wherein the at least one defined threshold is received by the user equipment from the e Node B.

6. The method according to claim 1, wherein the power headroom report includes information about how close the user equipment is operating to the total maximum transmission power capabilities including the power required for all component carriers.

7. The method according to claim 1, comprising defining several thresholds such that when the transmission power capability of the at least one power amplifier reaches any of the thresholds, the method provides information to the e Node B on how close the at least one power amplifier is operating to the maximum transmission power capabilities.

8. The method according to claim 7, wherein the power headroom report follows the LTE release 8 format modified by affecting values identifying each of the defined thresholds to some of the bits of the said format.

9. The method according to claim 2, wherein the power headroom report includes a bit to indicate whether the power headroom report is the power headroom report which is based on the determining step.

10. A user equipment configured for carrier aggregation with an e Node B, the user equipment comprising:

a processor configured to:

determine that the transmission power capability of at least one power amplifier of the user equipment reaches at least one defined threshold, and when a criterion that transmission power is (MPR (Maximum Power Reduction)+A-MPR (Additional Maximum Power Reduction)) dB below a total maximum transmission power capabilities including power required for all component carriers is satisfied, trigger a generation of a power headroom report based on the determination, wherein if the power headroom report is triggered according to the criterion, the user equipment does not perform power scaling; and a transmitter configured to send the power headroom report to the e Node B.

* * * * *